UNITED STATES PATENT OFFICE.

TORRENCE A. SWARTZ, OF HUGUENOT PARK, AND EDGAR F. OTTMYER, OF PRINCE BAY, NEW YORK, ASSIGNORS TO THE S. S. WHITE DENTAL MANUFACTURING COMPANY, A CORPORATION OF PENNSYLVANIA.

DENTAL RUBBER.

1,413,071.　　Specification of Letters Patent.　　Patented Apr. 18, 1922.

No Drawing.　　Application filed July 24, 1919. Serial No. 313,004.

*To all whom it may concern:*

Be it known that we, TORRENCE A. SWARTZ, a citizen of the United States, and a resident of Huguenot Park, in the county of Richmond, State of New York, and EDGAR F. OTTMYER, a citizen of the United States, and a resident of Prince Bay, in the county of Richmond, State of New York, have invented certain new and useful Improvements in Dental Rubbers, of which the following is a specification.

Our invention relates particularly to that class of rubber commonly known as "base-plate" rubber, and capable of use in making denture plates.

It is well known by the dental profession that rubber suitable for use in making denture base plate, and known as "base-plate" rubber, must contain such a percentage of rubber as to afford sufficient strength and toughness to withstand the strains incident to biting and chewing, and that such rubber as heretofore produced was of a color much darker than the natural color of the human gums, and that where it was desired to disguise the plate in the mouth, said plate was provided with a veneer of pink rubber, known as "veneer" or "pink" rubber, and containing a less proportion of rubber, and consequently of less strength and toughness than "base-plate" rubber, but more nearly simulating the natural color of the human gums.

The object of our invention is to provide a rubber compound that will simulate the natural pink color of the human gums of the mouth, yet affording the strength and toughness sufficient to withstand the strains incident to biting and chewing, and having all of the desirable characteristics that are inherent in "base-plate" rubber as heretofore produced.

Specifically stated, the form of our invention as hereinafter described, comprehends a vulcanizable compound consisting of rubber, sulphur, and compounding ingredients including pigments or coloring matters, which when vulcanized produces a strong, hard, tough substance resembling in color, the color of the natural normal gums of the human mouth.

Our invention also includes all of the various novel features as hereinafter more definitely specified.

We find that a vulcanizable dental rubber compound, which when vulcanized produces a pink substance closely simulating the natural gums of the human jaw, and having sufficient strength, hardness and toughness to be employed in the making of base plates for artificial dentures, may be produced by combining rubber, sulphur and compounding ingredients including pigments or coloring matters such as lithopone and similar white materials and vermilion and similar red materials, in the proportion approximating thirty-two (32%) per cent rubber, ten (10%) per cent sulphur, and fifty-eight (58%) per cent compounding ingredients including pigments or coloring matters, similar to those stated above.

We do not desire to limit our invention to the specific proportions herein set forth, as it is obvious that various modifications may be made therein without departing from the spirit and scope of the invention as defined in the appended claims.

Having thus described our invention, we claim:—

1. A vulcanizable dental base plate composition comprising rubber, sulphur, and compounding ingredients including pigments or coloring matters, which when vulcanized, produces a strong, hard, tough substance, suitable for making dental base plates and having a pink color approximating the pink color of the natural gums of the human mouth.

2. A vulcanizable dental base plate composition comprising approximately 32% rubber, 10% sulphur, and 58% compounding ingredients including pigments and coloring matter, which when vulcanized produces a strong, hard, tough substance suitable for making denture base plates and having a color approximating the pink color of the natural gums of the human mouth.

In witness whereof, we have hereunto set our hands the 2nd day of July, A. D., 1919, and the 2nd day of July, A. D., 1919, respectively.

TORRENCE A. SWARTZ.

Witnesses:
　CHRISTOPHER I. KAIN,
　ALBERT A. POND, Jr.

EDGAR F. OTTMYER.

Witnesses:
　JOHN M. RICE,
　ALBERT A. POND, Jr.